United States Patent [19]

Walk et al.

[11] 4,172,781

[45] Oct. 30, 1979

[54] WASTE WATER PROCESS FOR TREATMENT OF STRONG WASTES

[75] Inventors: Joe D. Walk, Homewood, Ill.; James F. Grutsch, Hammond; Russell C. Mallatt, Crown Point, both of Ind.

[73] Assignee: Standard Oil Company (Indiana), Chicago, Ill.

[21] Appl. No.: 806,749

[22] Filed: Jun. 15, 1977

[51] Int. Cl.² ............................ C02C 1/06; C02C 5/10
[52] U.S. Cl. .......................................... 210/7; 210/11; 210/17; 210/18; 210/40; 210/44
[58] Field of Search ................. 210/4, 7, 15, 17, 18, 210/39, 40, 44, 60, 63 R, 73 S, 730 W, 79, 82, 73 R, 11, 30 R

[56] References Cited

U.S. PATENT DOCUMENTS

| | | | |
|---|---|---|---|
| 2,059,286 | 11/1936 | Stathan | 210/18 |
| 2,368,055 | 1/1945 | Walker | 210/7 |
| 3,218,253 | 11/1965 | Clarke | 210/40 |
| 3,377,271 | 4/1968 | Cann | 210/7 |
| 3,551,203 | 12/1970 | Corson et al. | 210/39 |
| 3,617,539 | 11/1971 | Grutsch et al. | 210/82 |
| 3,730,881 | 5/1973 | Armstrong | 210/15 |
| 3,763,040 | 10/1973 | Timpe et al. | 210/40 |
| 3,764,524 | 10/1973 | Stankewich | 210/18 |
| 3,803,029 | 4/1974 | Blecharczyk | 210/17 |
| 3,904,518 | 9/1975 | Hutton | 210/40 |
| 3,957,632 | 5/1976 | Knopp et al. | 210/18 |
| 4,005,011 | 1/1977 | Sweeny | 210/18 |
| 4,053,396 | 10/1977 | Trense | 210/40 |
| 4,073,722 | 2/1978 | Grutsch et al. | 210/18 |

Primary Examiner—Charles N. Hart
Assistant Examiner—Ernest G. Therkorn

Attorney, Agent, or Firm—Frank J. Sroka; Arthur G. Gilkes; William T. McClain

[57] ABSTRACT

Disclosed is a waste water process for the treatment of strong wastes. Generally the process comprises an activated sludge process for the purification of waste water comprising: feeding the waste water to a first aeration zone wherein oxygen is introduced into the waste water, and said waste water is contacted with activated sludge; passing the effluent from the first aeration zone to a first clarification zone where the water from the first aeration zone is clarified to separate suspended sludge particles from partially decontaminated water; recycling a portion of the separated sludge from the first clarification zone to the first aeration zone and passing the partially decontaminated water from the first clarification zone to a second aeration zone; adding about 5 to about 500 ppm powdered activated carbon to the partially decontaminated water from the first clarification zone; oxygenating the partially decontaminated water containing carbon in a second aeration zone wherein oxygen or air is introduced into the partially decontaminated water; passing the effluent from the second aeration zone to a second clarification zone where the water from the second aeration zone is clarified to separate suspended sludge and carbon particles from decontaminated water; and recycling a portion of the separated sludge and carbon from the second clarification zone to the second aeration zone and passing decontaminated water out of the second clarification zone. Preferably said first aeration zone comprises a multiple stage aeration zone wherein waste water is aerated to introduce oxygen into the waste water in a first stage and the effluent from the first stage is aerated in one or more stages downstream of said first stage.

37 Claims, 1 Drawing Figure

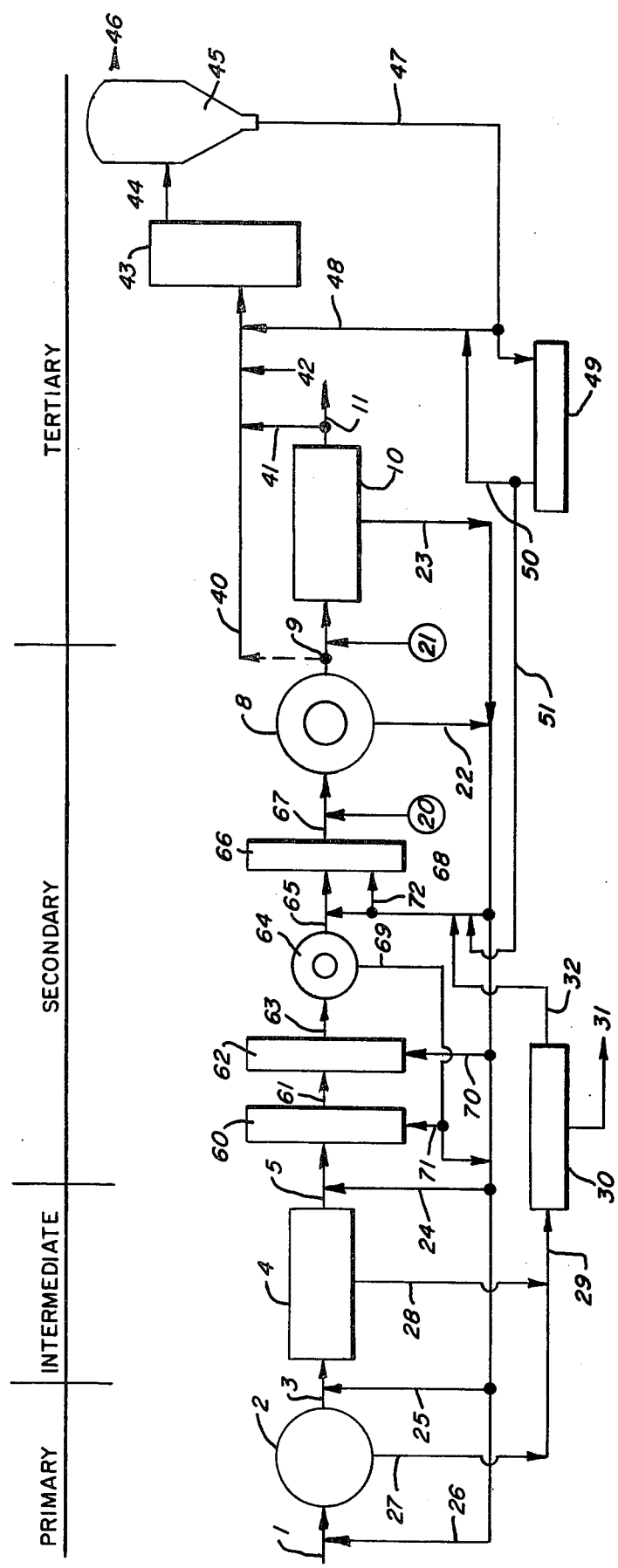

4,172,781

WASTE WATER PROCESS FOR TREATMENT OF STRONG WASTES

BACKGROUND

The tretment of contaminated waste water from municipal or industrial sources involves a sequence of processing steps for maximizing water purification at minimum costs. Industrial effluents, particularly waste water from oil refineries, include a broad spectrum of contaminants, and, consequently, such waste water is usually more difficult to decontaminate than waste water from municipal sewage systems. Four main sequential process treatments are used to decontaminate such industrial effluents although similar treatment is given municipal effluents, or combined municipal/industrial effluents. These are a primary, intermediate, secondary, and tertiary treatments. The primary treatment calls for removal of gross amounts of oil and grease and solids from the waste water. In the oil industry, usually separators of American Petroleum Institute design are employed from removal of free, separable oil and solids. In municipal waste water treatment, generally little free oil is present but solids removal is still needed. The intermediate treatment is the next process and it is designed to adjust water conditions so that the water entering the secondary treatment zone will not impair the operation of the secondary treatment processes. In other words, intermediate treatment is designed to optimize water conditions so that the secondary treatment process will operate most efficiently. The secondary treatment calls for biologically degrading dissolved organics and ammonia in the water. One of the most common biological treatment processes employed is the activated sludge process discussed below in greater detail. The tertiary treatment calls for removing residual biological solids present in the effluent from the secondary treatment zone and removing contaminants which contribute to impairing water clarity or adversely affecting water taste or odor. This is usually a filtration of the water, preferably through beds of sand, or combinations of sand and coal, followed by treatment with activated carbon. In some cases, air flotation can be used as an alternative to filtration.

The activated sludge process is a conventional waste water treating process which produces the highest degree of biological treatment in reasonably compact facilities at the present time. The application of this process to the treatment of industrial waste water has, however, been slow compared with municipal applications. Industrial applications of this process are nevertheless increasing rapidly. Currently, the activated sludge process is capable of achieving reduction in the five-day biological oxygen demand ($BOD_5$). However, the $BOD_5$ contaminants present in industrial waste water are relatively small compared with the total oxygen demanding contaminants present in such waste water as measured by the chemical oxygen demand (COD) test. For example, the $BOD_5$ contaminants present in the effluent from an activated sludge process typically ranges from 10 to 20 parts per million parts of water. It is not uncommon to also find present in such effluent 10 to 20 times this amount of COD.

The activated sludge process generally has two, three or four stages of treatment. In the first stage, contaminated water is contacted with the activated sludge. The sludge includes micro-organisms which feed on the contaminants in the water and metabolize these contaminants to form cellular structure and intermediate products. This decontaminated water flows into a second clarifier stage where suspended sludge particles are separated from the decontaminated water. A portion of the sludge is recycled to the first stage and the remainder is forwarded to the third and fourth stages. This sludge forwarded to the third and fourth stages includes water. In the third stage the sludge is thickened to remove excess water and in the fourth stage the thickened sludge is permitted to digest, that is, the micro-organisms feed upon their own cellular structure and are stabilized.

Recently, the importancce of powered activated carbon in waste water treatment is being realized. However, the use of powdered activated carbon has often been uneconomical because of under utilization of a given amount of carbon.

Many processes have wasted powdered activated carbon along with sludge prematurely.

Many industries have extremely strong wastes having a COD in excess of about 1000 mg/l. In some industries such as paper or chemicals, COD of about 10,000 mg/l is not uncommon. A process for the treatment of such strong wastes must be integrated in that each part of the purification process will cooperate in order to achieve maximum purification at low cost. It must also make full use of powdered activated carbonn without undue waste.

It is an object of this invention to provide a waste water process which produces high quality effluent, especially when treating strong wastes.

It is an object of this invention to provide a waste water process which makes efficient use of powdered activated carbon.

It is an object of this invention to provide an integrated waste water treatment process which reduces the amount of powdered activated carbon needed thereby making efficient use of said carbon, and produces a high quality effluent.

SUMMARY OF THE INVENTION

This invention relates to the treatment of waste water, especially the treatment of strong wastes having a COD in excess of about 1,000 mg/l. The process is an activated sludge process which makes use of powdered activated carbon.

Generally the activated sludge process for the purification of waste water comprises feeding the waste water to a first aeration zone wherein oxygen is introduced into the waste water, and said waste water is contacted with activated sludge; passing the effluent from the first aeration zone to a first clarification zone where the water from the first aeration zone is clarified to separate suspended sludge particles from partially decontaminated water; recycling a portion of the separated sludge from the first clarifiction zone to the first aeration zone and passing the partially decontaminated water from the first clarification zone to a second aeration zone; adding about 5 to about 500 ppm powdered activated carbon to the partially decontaminated water from the first clarification zone; oxygenating the partially decontaminated water containing carbon in a second aeration zone wherein oxygen or air is introduced into the partially decontaminated water; passing the effluent from the second aeration zone to a second clarification zone where the water from the second aeration zone is clarified to separate suspended sludge and carbon particles from decontaminated water; and recycling a portion of the separated sludge and carbon from the second clarification zone to the second aeration zone and passing decontaminated water out of the second clarification zone. In this process, a substantial amount of contaminants are removed from the water prior to the use of powdered activated carbon in the effluent of the first clarification zone. This protects the carbon from unnecessary contact with wastes or contaminants which can be easily removed otherwise. The powdered activated carbon is then available to other contaminants, thereby making efficient use of the carbon.

Generally the purified water effluent from the second clarification zone is filtered, for example by a granular bed filter, to remove small amounts of suspended solids which are carried out of the second clarification zone.

It is preferred that the first aeration zone comprise a multiplicity of aeration zones in series, such as two or three or more aeration zones in series. A series of aeration zones is more effective at reducing COD than a single large aeration zone.

Generally, the average sludge age in the first aeration zone is greater than about 10 days, preferably greater than about 30 days. Generally the average sludge age in the second aeration zone is greater than about 10 days, preferably greater than about 30 days.

In many instances, an activated sludge process is preceded by various other treatments in order to prepare the waste water for biological treatment, thereby obtaining a more effective water treating sequence. Generally the waste water is pretreated to substantially reduce chemical oxygen demand prior to the first aeration zone.

Primary and intermediate treatment prepares wastes or waste water for biological treatment. It is highly desirable to reduce the amount of non-soluble total organic carbon (TOC) which puts unnecessary burdens on the biological system. This non-soluble TOC, commonly colloidal in nature, is preferably substantially reduced so that the biological system can operate at greater efficiency. The amount of reduction of these colloidal materials such as solids and hydrocarbons vary with the type of wastes being treated. However, it is generally preferred to remove as much non-soluble TOC as is economically feasible. In, for example, oil refining of petroleum wastes, non-soluble contaminants can generally be reduced to less than about 20 ppm oil and grease and 20 ppm solids. It is preferable to reduce these contaminants to even lower levels, such as less than 10 ppm each. In municipal applications, it may not be necessary to reduce non-soluble TOC to these low levels, because solids in municipal primary effluents are commonly more biodegradable than refinery or chemical plant effluents. It is preferred to pretreat the waste water to reduce oil and solids to less than about 20 ppm each; feed the pretreted waste water to a first aeration zone wherein it is contacted with activated sludge and air or oxygen is introduced into the waste water so that the waste water is vigorously agitated; pass the affluent from the first aeration zone to a first clarification zone where the water from the first aeration zone is clarified to separate suspended sludge particles from partially decontaminated water; recycle a portion of the separated sludge from the first clarification zone to the first aeration zone and pass the partially decontaminated water from the first clarification zone to a second aeration zone; add about 5 to about 500 ppm powdered activated carbon to the partially decontaminated water from the first clarification zone; aerate the partially decontaminated water containing carbon in a second aeration zone wherein air is introduced into the water so that the waste water is vigorously agitated and oxygen is introduced into the partially decontaminated water; pass the effluent from the second aeration zone to a second clarification zone where the water from the second aeration zone is clarified to separate suspended sludge and carbon particles from decontaminated water; recycle a portion of the separated sludge and carbon from the second clarification zone to the second aeration zone; and pass the decontaminated water out of the second clarification zone.

In the pretreatment before biological treatment, gross amounts of oil, grease and solids can be removed from the oil refinery and/or chemical waste water by means of American Petroleum Institute separators. In treating municipal waste water, generally little oil is present but solids removal is carried out using clarifiers of conventional design. The effluent from this primary treatment typically includes from about 25 to about 150 parts of suspended solids per million parts of water and from about 25 to about 300 parts of oil and grease per million parts of water. In treating municipal waste, the oil level may be even lower. As is not commonly recognized, such waste water containing relatively large amounts of oil and/or solids, cannot be fed directly into an activated sludge process where the sludge age is in excess of about ten days without upsetting the activated sludge process. Excessive amounts of oil and hydrocarbon can result in gross quantities of oily, emulsified material collecting in the aeration zone and in the clarification zone of the activated sludge process. Such oily, emulsified soldis impair or prevent the activated sludge from decontaminating the water, impairs efficient separation of solids in the clarification zone, thereby causing the effectiveness of the activated sludge process to be substantially diminished.

Waste water is therefore subjected to intermediate treatment where excessive solids and/or hydrocarbons are removed and, preferably, contaminant concentrations are equalized so that such concentrations of contaminants remain more or less constant even though the contaminants concentration in the influent to the equalization treatment stage sharply changes from time to time. If waste water from a petroleum-chemical complex is being treated, it is desirable that the waste streams be combined and then subjected to intermediate treatment. If contaminant concentration in the influent changes and such change is sustained, this will ultimately result in a change in the contaminant concentration in the effluent from the equalization section. But in a staged equalization zone, this change initially will occur gradually over a relatively long time interval. This permits the micro-organism in the downstream activated sludge process to adapt or acclimate to this change in contaminant concentrartion while maintaining process purification efficiency.

Intermediate treatment commonly includes filtration or air flotation and, where needed, equalization. Equalization is conducted in a basin having two, preferably three or four compartments. These compartments are mixed and arranged in series so that water flows from one compartment to the next succeeding compartment. The total retention time of water in the basin is less than about 10 to 15 hours preferably 2 to 15 hours maximum. Consequently, heat loss is minimized. Normally, the difference in temperature between the influent and effluent water is 20° F. or less. Preferably the retention time in each compartment is 30 to 90 minutes.

Waste waters from the various sources are mixed in the first compartment, and the contaminant concentration is monitored. Usually pH, toxic metals, COD contaminants, phenolic, and ammonia concentrations are measured either manually or automatically. Since waste waters from multiple sources are fed into the relatively confined space in the first compartment, several advantages occur. First it is easy to monitor contaminant concentration and readily detect any drastic change in concentration indicating, for example, a break in a chemical line. The reason is because the first compartment in a multiple compartment system will more rapidly increase in concentration to more readily detectable levels than a single compartment system. Also neutralization is achieved. For example, one source of water may be highly acidic and another highly basic. Neutralization occurs as these streams mix in the first compartment. Waste streams from municipal sources generally do not vary greatly in acid/basic content.

The pH is adjusted in the equalization basin in order to maximize oxidation of certain contaminants, particularly sulfides. pH is adjusted by adding acid or base to the water in the second compartment until the water has a pH ranging from about 6.5 to about 9.5, preferably between 7.5 and 8.5. In some cases dissolved oxygen must be present to satisfy the immediate oxygen demand (IOD) of the contaminants in the water at a reasonable rate of oxidation. In these cases it may be preferable to add hydroquinone or gallic acid to the water to catalyze the oxidation of IOD contaminants. If this IOD is not satisfied, the downstream activated sludge process can be adversely affected. Consequently, the water in the equalization basin is commonly aerated. Conventional floating aerators may be used, Aeration is generally more effective in a confined zone. About 0.15 or more horsepower per thousand gallons of water provides efficient aeration. Aeration also thoroughly agitates and mixes the water with the result colloidal and suspended oils and solids are mechanically flocculated and accumulate on the water surface. These oily solids are removed by skimming. In order to ensure that the water to the activated sludge process contains low concentrations of hydrocarbon, such as oil and grease, and solids a coagulating and/or flocculating agent can be added to the water in the equalization basin or to the stream of water flowing to the activated sludge process. The coagulating and/or flocculating agent destabilizes colloidal particles which then aggregate. The aggregates are carried with the effluent stream to a filtration zone (filter) and removed prior to introduction of the stream to the activated sludge process. Air is sometimes introduced into the stream of water flowing into the downstream activated sludge process to ensure that the immediate oxygen demand to the water is satisfied. Dissolved air flotation can also be used to remove the destabilized colloidal particles.

Filters generally consist of a bed of granular nonporous material held in place by the force of gravity. The most widely used units are rapid-sand or combinations of sand and coal filters in which gravity holds the material in place, and in which the flow is vertically downward. The filter medium is usually supported on a gravel bed which is underlain by an underdrain system that collects the water into a pipe which conveys it to a filtered water chamber. In one common type of granular media filter system, screened gravel is installed in a series of layers several inches thick ranging from coarser stones at the bottom to 0.1-inch or smaller particles at the top.

The normal operation of granular filters involves downward flow through the media until pressure drop due to clogging, or breakthrough of suspended matter, increases to a predetermined limit. The filter is then cleaned by reversed flow fluidization after pretreatment by air scrubbing or a hydraulic surface wash. Commonly used filter media are sand, such as rough or rounded silica sand, silica gravel, garnet sand, crushed or alluvial anthracite, and polymeric materials such as particles of polystyrene, polyethylene and the like. Often, several materials are used in layers in a single filter, sometimes called a mixed media filter. In some cases, fibrous materials can be used.

Filter beds utilize the coarse material comprising the bottom gravel layer to absorb the energy of the high velocity jets emerging from the underdrain system during a backwash operation. Once the backwashing streams emerge through the gravel layer their flow is slowed down enough to allow them to spread uniformly under the entire sandbed but still retain enough velocity to fluidize the finer granular filter media. This is important since these types of filters are periodically cleaned with filtered water by reversal of flow and discharge of the sediment-laden water to a drain. Most rapid-sand filters are contained in concrete boxes and designed so that the upward flow of washwater, with auxiliary scouring systems, lifts the removed sediment out of the expanded filter medium and flushes it away to a point of disposal.

Granular media filters are frequently referred to as gravity or pressure filters. Since granular media filters are only a small part of the spectrum in filtration art, the meaning associated with these descriptions may be at variance with other filter technology. In the simmpler terms, a gravity filter is a downflow design in which the water standing above the filter media is under atmospheric pressure. A gravity unit may be operated as a constant or declining rate unit; i.e., as the filter media clogs and the pressure drop increases, the rate may be maintained by increasing the head of water above the media, or allowed to decrease by maintaining a constant head. The pressure drops across a freshly regenerated unit is about 1 foot of water and the pressure drop at the end of the filter cycle may be as little as 5 feet or as much as 10-12 feet of water. A pressure filter of the granular media type is simply the same system in an enclosed vessel; i.e., the operating pressure drops across the media are about the same. In contrast, pressure filers in filtration systems other than the granular media type may have pressure drops orders of magnitude higher. Within the framework of these descriptions it is obvious that a variety of engineering and hydraulic designs are possible.

As time on stream progresses, these granular media filters lose effectiveness. The filter media becomes contaminated with various organic and inorganic substances to the point where it will no longer operate properly. Often, simple backwashing of the fitler is sufficient to at least partially restore filter efficiency. Backwashing is conducted by reversing the flow of liquid through the filter bed.

When activated carbon is used in secondary treatment, it is commonly added to the second-aeration zone or to the feed to the second aeration zone, separated in a clarification zone, and at least a portion of it recycled to the aeration zone. By operating at high sludge ages this provides a mechanism for increasing the utilization of the carbon. Activated carbon can also be added to the second aeration zone effluent or to the second clarification zone. The carbon is commonly added here. Contact time between the carbon and contaminants in the water can be increased by various configuration of piping or second aeration zones.

It is perferable to add the activated carbon to the effluent from the second aeration zone. With this mode of addition, the carbon is contacted with water having a relatively low concentration of soluble contaminants and not exposed to premature spending by contact with larger concentrations of soluble organics in the aeration zone because of mixing and distribution problems often processing in the aeration zone. Contact time between the carbon and contaminants in the water can be increased by piping configurations and the size of a reaction zone in a special clarifier of the wide well type.

It is still more preferable to add activated carbon to the second clarification zone effluent. With this point of addition, fresh carbon is contacted with water having very little solids which would unnecessarily burden the carbon. Also, fresh carbon with maximum activity is available to purify the water after biological treatment, a point in the process where many consider it difficult to purify the water further. The carbon can be added to this point either continuously or discontinuously. Preferably, a discontinuous slug addition of carbon can be made and captured by a downstream mixed media granular filter. Water passing through the filter would contact high concentrations of powdered activated carbon. From time to time, the carbon can be backwashed to be recycled to the second aeration zone feed or effluent, first aeration zone or feed to the first aeration zone, or to carbon regeneration.

Sludge and powdered activated carbon are separated from water in the second clarification zone for recycle chiefly to the second aeration zone. This separation is commonly done by a wide-well clarifier. Tis recycle also provides a method for cycling up the concentration of activated powdered carbon in the aeration zone, thereby achieving much higher concentrations of carbon than the carbon addition rate per gallon of waste water. This high concentration of powdered activated carbon is highly beneficial to improved water purification. Recycling sludge and carbon to the aeration zone also provides for the fuller utilization of the carbon by providing for longer contact time with contaminants. Separated sludge and carbon can also be recycled or wasted to the first aeration zone. In this manner, the carbon is further contacted with contaminants.

Commonly the decontaminated water leaving the second clarification zone is passed to a granular media bed filter for filtration to remove suspended matter. Powdered activated carbon can be added to the inlet of the granular media bed filter so that the fresh carbon will be contacted with the water containing low soluble TOC. This procedure gives an extra increment of purification. Preferably, a discontinuous slug addition of carbon should be made, but powdered activated carbon should not be added at such high amounts as to plug the filter. However, as water is passed through the filter, ultimately some plugging can be expected. The filters are occasionally backwashed to reduce filter plugging and to remove activated carbon and residual organic material, commonly to the second aeration zone.

In most cases, about 5 to about 500 parts of fresh powdered activated carbon per part of feed waste water is added to the water. However, it is generally preferable to use lower concentration of carbon such as about 5 to about 40 parts of fresh powdered activated carbon per part of feed waste water. Most preferably, less than about 30 parts of fresh powdered activated carbon per part of feed waste water is added.

The preferred activated carbon has a BET surface area greater than about 1500, more preferably greater than about 2000, and still more preferably greater than about 2500 square meters per gram. Commonly such activated carbon is in powdered form and has a particle size such that at last 50 percent of it will pass through at 200 mesh per inch sieve, although generally about 70 to about 99 percent will pass through such a sieve.

Some powdered activated carbons have a high, negative electrical surface charge, for example a zeta potential of $-20$ to $-30$ millovolts. Coulombic repulsive forces keep more and more of the carbon particles in suspension as the size of the carbon particles get smaller. The negative electrical surface charge on fiter's granular media also repulses the negatively charged carbon fines resulting in poor filtration efficiency such as the loss of carbon to the effluent. Reducing the electrical charge on carbon particles is important to improving the handling and application of powdered activated carbon.

In view of the above, and the desire to effect essentially total capture of substantially all carbon after the second stage, control of the zeta potential of carbon and control of the electrical charge on the filer media is important. Since the electrical charge of these surfaces is generally negative, control of surface charge can be effected by treating with surface active agents. Cationic type organic surfactants and/or polyelectrolytes can be used to adsorb on the surface of the particle and modify the charge. Examples of such well known surface active chemicals are fatty diamines, polyalkylene polyamides, dimethyl dialkyl ammonium chloride polymrs (DMDAAC), copolymers of DMDAAC and acrylamide, quaternized fatty amines, polyacrylamides, and the like.

Another method of controlling the electrical surface charge on activated carbon is through the incorporation of certain metals into the carbon. Suitable metals are, for example, iron, magnesium, aluminum, tin, zirconium, and thorium. Magnesium is well suited for this purpose because of its effectiveness, low cost and high availablility. The amount of metal needed to reduce the zeta potential will depend on the metal and method of incorporation, the type of carbon and method of preparation, and the desired level of reduction in zeta potential.

Common periods for incorporation of metals are during the carbonization or activation steps during the manufacture of activated carbon, or after the activation step such as to the final product This latter means of metal incorporation can be achieved by simply soaking the activated carbon in a solution of the metal salt. Generally the metal is used in an inexpensive form. When incorporated during carbonization or activation steps, metal oxides, carbonates, inorganic salts, and organometallic salts such as soaps are suitable. When the metal is incorporated by adsorption onto activated carbon, the metal should be applied in a soluble form, then possibly insolubilized by hydrous oxide formation. It is preferred that the carbon has a zeta potential more positive than about −10 millivolts, more preferably about −5 to about +5 millivolts.

Activated carbon is commercially available. High activity, high surface area activated carbon will be available under the Amoco trademark. Suitable processes for making activated carbons can be found in U.S. Pat. Nos. 3,709,930; 3,726,808; 3,624,004; 3,642,657; 3,817,874; and 3,833,514, which are hereby incorporated by reference and made a part hereof.

After powdered activated carbon is contacted with contaminants or impurities, its ability to adsorb and purify becomes diminished. In order to make efficient use of the powdered activated carbon, it is often desirable to regenerate or reactivate the carbon for reuse.

In some cases, such as municipal plants, sand, direct, grit, and the like are present which impair the regeneration of powdered activated carbon. In these instances, the carbon may not be suitable for regeneration.

Where carbon regneration is feasible, a portion or all of the spent or partially deactivated powdered carbon may be sent to a regeneration zone where powdered activated carbon is at least partially regenerated or reactivated. The reactivated or regenerated carbon can be passed to the aeration zone for further adsorption and bio-enhancement. The carbon is at least partially regnerated to partially restore its adsorption properties. Generally adsorbed organics are thermally removed and the carbon surface is reactivated. Depending on economic factors, it is desirable to reactivate the carbon to different levels. While it is generally preferred to regenerate the carbon to at least about 70 percent of its original BET surface activity, it may be sometimes desirable to regenerate to somewhat lower levels.

The activated carbon can be reactivated or regenerated by any number of methods. For example, the carbon can be incinerated in order to oxidize organic materials off the carbon. Oxidation gas conditions must be carefully controlled so that the carbon is not burnt up. One common method of incineration is a fluid bed process which circulates a hot heat conducting material such as sand, to which the sludge/carbon mixture is injected. Fluid bed incinerators commonly operate in the range of from about 1200° F. to about 1500° F. Another common method of incineration is a multiple hearth carbon regeneration process. This process passes the carbon/sludge mixture to a furnace having a carefully controlled atmosphere. Different zones of the furnace have different temperatures for drying, oxidation of organics, and regeneration of the carbon. The operating temperatures range from about 1200° F. to about 1900° F.

One preferred method of carbon regeneration is the wet air oxidation process. In this process, the carbon to be regenerated is thickened and passed as a slurry to a zone where it is contacted with air under very high pressue at elevated temperature. Commonly the regeneration takes place to about 390° F. to about 470° F. whereat regeneration and selective oxidation takes place. The regeneration is conducted without dewatering the carbon slurry. The regenerated carbon slurry and regenerator gases are cooled and returned to the waste water process.

The purified water from the second clarification zone often contains some finely divided carbon particles and other suspended solids. It is preferable to subject this water to filtration to remove suspended solids. In some cases, it may be desirable to contact the purified water from this process with powdered activated carbon to produce an effluent of extremely high purity. This can be done by passing the purified or partially purified water from the second clarification zone or from the second filtration zone to a reactor where the water is contacted with high concentrations of powdered activated carbon. Chemical agents may be added to the clarifier effluent to destabilize colloidal suspensions and assist filtration. About 1 to about 100 parts powdered activated carbon per million parts of feed water are added to the feed to the reactor or to the reactor. The powdered activated carbon is separated from the purified water and a portion of the separated carbon is recycled to the feed to the reactor or to the reactor. A portion of the separated carbon can be regenerated or reactivated for reuse. The separation of the powdered activated carbon can be achieved by a cyclone separation. The discrete particles of active carbon are separated from the treated water in a solid-liquid cyclone separator. In a cyclone separator, water and solids are separated by centrifugal action. The flow containing the carbon particles enters the cylindrical inlet chamber of the cyclone near the periphery in a tangential pattern under controlled velocities. The resultant cyclonic flow pattern develops a centrifugal force that retains the carbon articles along the outer wall of the cyclone vessel. The controlled centrifugal flow pattern creates an outer spiraling flow pattern of the carbon particles along and down the outer wall of the cyclone leading to the apex opening where the carbon particles are discharged from the cyclone. As the spiraling flow pattern of the carbon particles is formed along the cyclone wall, an inner spiraling pattern of clarified water is formed. The spiraling clarified water enters into an exit pipe extending down into the vortex region of the cyclone and is thereby discharged from the cyclone.

One especially preferred method of removing carbon from water is wherein the cyclone separator is contained within a reactor vessel which also contains the reaction zone. In this matter, construction costs are minimized. The reactor vessel, which provides for the bulk of carbon contact time and concentration, may enclose the cyclone. This provides for a compact arrangement and simplifies the cyclone construction since it no longer has to withstand the high pressure of the system. Further, multiple inlet parts to the cyclone providing tangential cyclone flow patterns are more easily and economically provided for. The carbon captured by the cyclone may be recycled back to the reactor, externally to an eductor type mixer-contactor, or externally to regeneration or wastage.

THE DRAWING

The FIGURE is a schematic representation of a waste water treating process employing the concepts of the invention. Waste water to be treated is passed through line 1 to primary clarification zone 2. In primary clarification zone 2, commonly referred to as primary treatment, a crude separation of easily separable components is carried out. By allowing sufficient settling time, materials are allowed to either float on top of the water where they can be skimmed off, or allowed to settle down to the bottom of the tank of the zone by gravity where they can be removed. Partially purified water from primary clarification zone 2 is passed through line 3 to filtration or air flotation zone 4. Filtration (or air flotation) zone 4 is commonly that portion of a waste water treatment process called intermediate treatment. In many cases, the water is subjected to equalization and chemical treatment, especially treatment with coagulants, prior to filtration in filtration zone 4. This intermediate treatment prepares the water for downstream treatment in a biological zone. By reducing oil and solids, especially colloidal matter, the downstream biological system can work much more efficiently. It is generally desirable for the effluent leaving the intermediate zone to contain as little contaminants as possible. Often it is desirable to reduce oil and grease, and solids, to less than about 20 parts per million each, preferably to less than 10 parts per million each. Filtered water leaves filtration zone 4 through line 5 where it passed through biological treatment, commonly called secondary treatment. Filtered water passes from line 5 to aeration zone 60 where it is contacted with activated sludge and with oxygen, preferably in form of air, for a time sufficient to at least partially degrade the contaminants present. The water/sludge mixture is passed out of aeration zone 60 through line 61 to aeration zone 62 wherein the mixture is further contacted with oxygen, preferably in the form of air for a time sufficient to at least partially degrade the contaminants present. Aeration zones 60 and 62 are two aeration stages in series which comprise a multi-stage first aeration zone. The water/sludge mixture is passed out of aeration zone 62 through line 63 to an interstage clarifier, here first clarification zone 64. Zone 64, preferably a wide well clarifier, separates partly purified water from sludge and solids. Partly purified water is passed from zone 64 through line 65 to second aeration zone 66 where the water is contacted with powdered activated carbon and air. Because of the first aeration zone and interstage clarifier, the powdered activated carbon is spared contact with unnecessary contaminants which would unnecessarly deactivate it. After sufficient contact between water, sludge and carbon to attain a desirable level of water purity, the mixture is passed out of aeration zone 66 through line 67 to second clarification zone 8. Second clarification zone 8 performs a separation between water and suspended solids such as activated sludge and carbon. A preferred clarification zone 8 is a wide well clarifier. Separated sludge and activated carbon from second clarification zone 8 passes through line 22 for recycle through line 68 to line 65, the first clarification zone effluent; through lines 68 and 72 to the second aeration zone; through line 70 to the first aeration zone; through line 24 to the filtration zone effluent; through line 25 to the effluent from primary settling; or through line 26 to feed to primary settling. In some cases, both primary and intermediate stages are combined as one. Separated sludge from first clarification zone 64 is passed through line 69 for recycle to the first aeration zone through line 71, through lines 23 and 24 for recycle to the filtration zone effluent, through lines 23, and 25 to the primary clarification effluent, and through lines 23 and 26 to the feed to the primary clarification zone. Powdered activated carbon can be introduced into the system at numerous points. A preferred point of addition is to the aeration zone effluent by addition at point 20 to line 67. A more preferred point of powdered activated carbon addition is at point 21 to second clarification zone effluent at line 9. It is often desirable to pass water from second clarification zone 8 through line 21 to a second filtration zone 10 in order to remove any suspended matter such as suspended carbon or activated sludge. When powdered activated carbon is added at point 21 to clarification zone effluent passing through line 9 to filtration zone 10, the filtration zone 10 will commonly contain large amounts of carbon. This carbon can occasionally be backwashed from filter 10 through line 23 back to recycle points through lines 68, 72, 24, 25 and 26. A preferred scheme of recycle is to recycle a predominant amount of the separated sludge and carbon from second clarification zone 8 and filtration zone 10 to the feed to second aeration zone 66 or to aeration zone 66. Sludge and powdered activated carbon from zones 8 and 10 are wasted to the first aeration zone, such as to second stage aeration zone 62. A predominant amount of separated sludge and carbon from first clarification zone 64 is recycled to the first aeration zone, such as to the first stage aeration zone 60. Sludge and powdered activated carbon to be wasted from first clarification zone 64 are recycled through line 25 to intermediate treatment influent, such as filtration zone influent; or through line 26 to feed to the primary clarification zone. Water is passed out of filter 10 through line 11. In some cases, it is desirable to purify water to an extremely high level. In those cases effluent from second clarification zone 8 can be passed from line 9 through line 40 or effluent from second filtration zone 10 can be passed from line 11 through line 41 to a final clean up procedure using powdered activated carbon. Water from lines 40 or 41 is contacted with powdered activated carbon which is added at point 42 and then passed on to a reaction zone 43. In this reaction zone, the water is allowed to contact the powdered activated carbon for sufficient time to remove impurities to desired levels. The water and carbon mixture then passes through line 44 to separator 45 which separates powdered activated carbon from water. A preferred separation means is a cyclone type separation zone. An even more preferred configuration houses separation zone 45 within reaction zone 43 so that reaction separator 45 need not have a significant pressure drop across its walls. Purified water is removed from separation zone 45 through line 46. Separated powdered activated carbon is removed from separator 45 through line 47 either for recycle through line 48 to line 40, or for regeneration in regeneration zone 49. Regenerated powdered activated carbon from regeneration zone 49 can be passed through line 50 to line 48 for recycle or can be passed through line 51 for use in the upstream biological system, such as recycling to the second aeration zone 66.

A portion of the powdered activated carbon which is backwashed from filter 4 can be passed through line 28 and 29 to regeneration zone 30 for the regeneration of powdered activated carbon. Where powdered activated carbon is recycled to the feed waste water at line 1 and separated out in first separation zone 2, a portion of this separated powdered activated carbon can be passed through line 27 and 29 for regeneration in regeneration zone 30. Regenerated or reactivated carbon from regeneration zone 30 can be passed out through line 32 for reuse in secondary treatment such as by addition to aeration zone 66.

We claim:

1. An activated sludge process for the purification of waste water comprising:

feeding the waste water to a first aeration zone wherein oxygen or air is introduced into the waste water, and said waste water is contacted with activated sludge;

passing the effluent from the first aeration zone to a first clarification zone where the water from the first aeration zone is clarified to separate suspended sludge particles from partially decontaminated water;

recycling a portion of the separated sludge from the first clarification zone to the first aeration zone and passing the partially decontaminated water from the first clarification zone to a second aeration zone;

adding about 5 to about 500 ppm powdered activated carbon to the partially decontaminated water from the first clarification zone;

oxygenating the partially decontaminated water containing carbon in a second aeration zone wherein oxygen or air is introduced into the partially decontaminated water;

passing the effluent from the second aeration zone to a second clarification zone where the water from the second aeration zone is clarified to separate suspended sludge and carbon particles from decontaminated water, and recycling a portion of the separated sludge and carbon from the second clarification zone to the second aeration zone so as to maintain the average sludge age in the second aeration zone greater than about 10 days, and passing decontaminated water out of the second clarification zone.

2. The process of claim 1 wherein a portion of the suspended sludge and carbon from the second clarification zone is recycled to the first aeration zone.

3. The process of claim 1 wherein the first aeration zone comprises a multiplicity of aeration zones in series.

4. The process of claim 3 wherein the first aeration zone comprises two aeration zones in series.

5. The process of claim 1 wherein the average sludge age in the first aeration zone is greater than about 10 days.

6. The process of claim 5 wherein the average sludge age in the first aeration zone is greater than about 30 days.

7. The process of claim 1 wherein the average sludge age in the second aeration zone is greater than about 30 days.

8. The process of claim 1 wherein the decontaminated water leaving the second clarification zone is passed to a granular media bed filter for filtration.

9. The process of claim 8 wherein the powdered activated carbon is added to the inlet of the granular media bed filter.

10. The process of claim 9 wherein the filters are occasionally backwashed to reduce filter plugging and to remove activated carbon and residual organic material.

11. The process of claim 10 wherein the activated carbon and residual organic material are backwashed to the second stage aeration zone.

12. The process of claim 1 wherein the waste water is pretreated to substantially reduce chemical oxygen demand prior to the first aeration zone.

13. The process of claim 12 wherein the waste water is pretreated to reduce oil and solids to less than about 20 ppm each.

14. The process of claim 1 wherein the powdered activated carbon has a surface area greater than about 1500 square meters per gram.

15. The process of claim 14 wherein the powdered activated carbon has a surface area greater than about 2500 square meters per gram.

16. The process of claim 1 wherein about 5 to about 40 parts of carbon are added per million parts of water.

17. The process of claim 1 wherein the powdered activated carbon has a zeta potential more positive than about minus ten millivolts.

18. An activated sludge process for the purification of waste water comprising:

pretreating the waste water to reduce oil and solids to less than about 20 ppm each;

feeding the pretreated waste water to a first aeration zone wherein it is contacted with activated sludge and air or oxygen is introduced into the waste water so that the waste water is vigorously agitated; and passing the effluent from the first aeration zone to a first clarification zone where the water from the first aeration zone is clarified to separate suspended sludge particles from partially decontaminated water;

recycling a portion of the separated sludge from the first clarification zone to the first aeration zone and passing the partially decontaminated water from the first clarification zone to a second aeration zone;

adding about 5 to about 500 ppm powdered activated carbon to the partially decontaminated water from the first clarification zone;

aerating the partially decontaminated water containing carbon in a second aeration zone wherein air or oxygen is introduced into the water so that the waste water is vigorously agitated and oxygen is introduced into the partially decontaminated water;

passing the effluent from the second aeration zone to a second clarification zone where the water from the second aeration zone is clarified to separate suspended sludge and carbon particles from decontaminated water;

recycling a portion of the separated sludge and carbon from the second clarification zone to the second aeration zone so as to maintain the average sludge age in the second aeration zone greater than about 10 days; and passing the decontaminated water out of the second clarification zone.

19. The process of claim 18 wherein about 5 to about 40 parts of powdered activated carbon are added per million parts of water.

20. The process of claim 18 wherein the powdered activated carbon has a zeta potential more positive than about minus ten millivolts.

21. An activated sludge process for the purification of waste water comprising:

feeding the waste water to a first aeration zone, said first aeration zone comprising a multiple stage aeration zone wherein waste water is aerated to introduce oxygen into the waste water in a first stage and the effluent from the first stage is aerated in one or more stages downsteam of said first stage;

passing the efffluent from the first aeration zone to a first clarification zone where the water from the first aeration zone is clarified to separate suspended sludge particles from partially decontaminated water;

recycling a portion of the separated sludge from the first clarification zone to the first aeration zone and passing the partially decontaminated water from the first clarification zone to a second aeration zone;

adding about 5 to about 500 ppm powdered activated carbon to the partially decontaminated water from the first clarification zone;

oxygenating the partially decontaminated water containing carbon in a second aeration zone wherein oxygen or air is introduced into the partially decontaminated water;

passing the effluent from the second aeration zone to a second clarification zone where the water from the second aeration zone is clarified to separate suspended sludge and carbon particles from decontaminated water; and recycling a portion of the separated sludge and carbon from the second clarification zone to the second aeration zone so as to maintain the average sludge age in the second aeration zone greater than about 10 days, and passing decontaminated water out of the second clarification zone.

22. The process of claim 21 wherein a portion of the suspended sludge and carbon from the second clarification zone is recycled to the first aeration zone.

23. The process of claim 21 wherein the first aeration zone comprises two aeration zones in series.

24. The process of claim 21 wherein the average sludge age in the first aeration zone is greater than about 10 days.

25. The process of claim 24 wherein the average sludge age in the first aeration zone is greater than about 30 days.

26. The process of claim 24 wherein the filter is occasionally backwashed to reduce filter plugging and remove activated carbon and residual organic material.

27. The process of claim 26 wherein the activated carbon and residual organic material are backwashed to the second aeration zone.

28. The process of claim 21 wherein the average sludge age in the second aeration zone is greater than about 30 days.

29. The process of claim 21 wherein the decontaminated water leaving the second clarification zone is passed to a granular media bed filter for filtration.

30. The process of claim 29 wherein the powdered activated carbon is added to the water passing to the granular media filter.

31. The process of claim 21 wherein the waste water is pretreated to substantially reduce chemical oxygen demand prior to the first aeration zone.

32. The process of claim 31 wherein the waste water is pretreated to reduce oil and solids to less than about 20 ppm each.

33. The process of claim 21 wherein the powdered activated carbon has a surface area greater than about 1500 square meters per gram.

34. The process of claim 33 wherein the powdered activated carbon has a surface area greater than about 2500 square meters per gram.

35. The process of claim 21 wherein about 5 to about 40 parts of powdered activated carbon is added per million parts of water.

36. The process of claim 21 wherein the powdered activated carbon has a zeta potential more positive than about minus ten millivolts.

37. The process of claim 21 wherein the effluent from filtration is contacted with powdered activated carbon in a reaction zone for a time sufficient to reduce contaminants to low levels, purified water is separated from the powdered activated carbon, and a portion of the powdered activated carbon is recycled to the reaction zone.

* * * * *

UNITED STATES PATENT OFFICE
CERTIFICATE OF CORRECTION

Patent No. 4,172,781          Dated October 30, 1979

Inventor(s) Joe D. Walk, James F. Grutsch and Russell C. Mallatt

It is certified that error appears in the above-identified patent and that said Letters Patent are hereby corrected as shown below:

| Patent Column | Line | |
|---|---|---|
| 1 | 7 | "tretment" should read --treatment-- |
| 1 | 22 | "from removal" should read --for removal-- |
| 2 | 28 | "carbonn" should read --carbon-- |
| 2 | 57 | "clarifiction" should read --clarification-- |
| 3 | 57 | "pretreted" should read --pretreated-- |
| 3 | 60 | "affluent" should read --effluent-- |
| 4 | 35 | "soldis" should read --solids-- |
| 4 | 45 | "contaminants concentration" should read --contaminant concentration-- |
| 4 | 56 | "micro-organism" should read --micro-organisms-- |
| 6 | 38 | "simmpler" should read --simpler-- |

UNITED STATES PATENT OFFICE
CERTIFICATE OF CORRECTION

Patent No. 4,172,781   Dated October 30, 1979

Inventor(s) Joe D. Walk, James F. Grutsch and Russell C. Mallatt

It is certified that error appears in the above-identified patent and that said Letters Patent are hereby corrected as shown below:

| Patent Column | Line | |
|---|---|---|
| 6 | 52 | "filers" should read --filters-- |
| 7 | 41 | "Tis" should read --This-- |
| 8 | 14 | "at last" should read --at least-- |
| 8 | 19 | "millovolts" should read --millivolts-- |
| 8 | 22 | "fiter's" should read --filter's-- |
| 8 | 40 | "polymrs" should read --polymers-- |
| 9 | 56 | "pressue" should read --pressure-- |
| 9 | 57 | "to about" should read --at about-- |
| 11 | 35 | "unnecessarly" should read --unnecessarily-- |
| 12 | 4 | "72, 24," should read --72, 70, 24,-- |

Signed and Sealed this

Fourth Day of March 1980

[SEAL]

Attest:

SIDNEY A. DIAMOND

Attesting Officer   Commissioner of Patents and Trademarks